United States Patent
Zeng et al.

(10) Patent No.: US 12,301,831 B2
(45) Date of Patent: May 13, 2025

(54) LINEAR MODEL PREDICTION METHOD AND CODER

(71) Applicant: ZHEJIANG DAHUA TECHNOLOGY CO., LTD., Hangzhou (CN)

(72) Inventors: Feiyang Zeng, Hangzhou (CN); Dong Jiang, Hangzhou (CN); Jucai Lin, Hangzhou (CN); Jun Yin, Hangzhou (CN); Cheng Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 519 days.

(21) Appl. No.: 17/676,798

(22) Filed: Feb. 21, 2022

(65) Prior Publication Data

US 2022/0217358 A1 Jul. 7, 2022

Related U.S. Application Data

(63) Continuation of application No. PCT/CN2020/110309, filed on Aug. 20, 2020.

(30) Foreign Application Priority Data

Aug. 21, 2019 (CN) .......................... 201910775848.4

(51) Int. Cl.
*H04N 19/149* (2014.01)
*H04N 19/105* (2014.01)
(Continued)

(52) U.S. Cl.
CPC ......... *H04N 19/149* (2014.11); *H04N 19/105* (2014.11); *H04N 19/176* (2014.11); *H04N 19/46* (2014.11); *H04N 19/70* (2014.11)

(58) Field of Classification Search
CPC .. H04N 19/105; H04N 19/119; H04N 19/149; H04N 19/159; H04N 19/176;
(Continued)

(56) References Cited

U.S. PATENT DOCUMENTS

| 2017/0150183 A1 | 5/2017 | Li et al. |
| 2019/0215522 A1 | 7/2019 | Zhang et al. |

(Continued)

FOREIGN PATENT DOCUMENTS

| CN | 102215396 A | 10/2011 |
| CN | 103369315 A | 10/2013 |

(Continued)

OTHER PUBLICATIONS

International search report and Written Opinion of the International Search Authority, International Application No. PCT/CN2020/110309, mailed Nov. 26, 2020 (10 pages).

(Continued)

*Primary Examiner* — Kathleen M Walsh

(57) ABSTRACT

A linear model (LM) prediction method and a coder are disclosed. The method includes dividing a current coding block into at least two sub-blocks; for each of the sub-blocks, constructing a linear model, wherein parameters of the linear model are calculated by using pixel values of adjacent reconstructed pixels of the sub-block and adjacent reconstructed pixels of a reference sub-block of the sub-block; and predicting the sub-block by using the linear model, and obtaining a LM prediction value of the sub-block.

20 Claims, 5 Drawing Sheets

S1 — Dividing a current coding block into at least two sub-blocks

S2 — Constructing a linear model for each sub-block

S3 — Predicting the sub-block by using the linear model, and obtaining a linear model prediction value of the sub-block

(51) Int. Cl.
*H04N 19/176* (2014.01)
*H04N 19/46* (2014.01)
*H04N 19/70* (2014.01)

(58) Field of Classification Search
CPC .... H04N 19/186; H04N 19/46; H04N 19/593; H04N 19/70
USPC .................................................. 375/240.02
See application file for complete search history.

(56) References Cited

U.S. PATENT DOCUMENTS

| | | | | |
|---|---|---|---|---|
| 2020/0336738 | A1* | 10/2020 | Xiu | H04N 19/105 |
| 2021/0051342 | A1* | 2/2021 | Galpin | H04N 19/593 |
| 2021/0243465 | A1* | 8/2021 | Chen | H04N 19/46 |
| 2022/0030257 | A1* | 1/2022 | Deng | H04N 19/105 |

FOREIGN PATENT DOCUMENTS

| | | | |
|---|---|---|---|
| CN | 103517069 | A | 1/2014 |
| CN | 108293137 | A | 7/2018 |
| CN | 108464002 | A | 8/2018 |
| CN | 109076210 | A | 12/2018 |
| CN | 109314783 | A | 2/2019 |
| CN | 109792529 | A | 5/2019 |
| CN | 109804628 | A | 5/2019 |
| CN | 110087087 | A | 8/2019 |
| CN | 110446044 | A | 11/2019 |
| WO | WO2018174617 | A1 | 9/2018 |
| WO | WO2019143602 | A1 | 7/2019 |
| WO | WO2019147910 | A1 | 8/2019 |

OTHER PUBLICATIONS

CE3-1.1: CU-based prediction for 1xN and 2xN sub-partitions.
Chinese First office action, Chinese Application No. 201910775848.4, mailed Feb. 2, 2021 (17 pages).
Chinese second office action, Chinese Application No. 201910775848.4, mailed Jun. 3, 2021 (19 pages).
Rejection decision, Chinese Application No. 201910775848.4, mailed Oct. 11, 2021 (22 pages).
S.E.Moya Flexible platform for coding evaluation in narrowband power line communication.
Notification to Grant Patent Right for Invention, Chinese Application No. 201910775848.4, mailed Jun. 1, 2022 (7 pages).
Wang Haiyang—Research and application of texture visualization technology of LIC in flow field.
Video coding / decoding based on H.264.
Chen J et al: "Algorithm description for Versatile Video Coding and Test Model 6 (VTM 6)", 15. JVET Meeting; Jul. 3, 2019-Jul. 12, 2019;Gothenburg ; (The Joint Video Exploration Team of ISO/IEC JTC1/SC29/WG11 and ITU-TSG.16 ),tno. JVET-O2002 Aug. 15, 2019 (Aug. 15, 2019), XP030293945(80 pages).
C-M Tsai et al: "CE3.4.4: Additional LM-based modes for intra chroma prediction", 11. JVET Meeting; Jul. 11, 2018-Jul. 18, 2018;Ljubljana ; (The Joint Video Exploration Team of ISO/IEC JTC1/SC29/WG11 and ITU-TSG.16 ),tno. JVET-K0241 Jul. 10, 2018 (Jul. 10, 2018), XP030199289(6 pages).
European Search Report, EP 20853661.5,malied Oct. 20, 2022(11 pages).
European Examination Report, European Application No. 20853661.5, mailed Jun. 7, 2024 (9 pages).

* cited by examiner

LINEAR MODEL PREDICTION METHOD AND CODER

CROSS-REFERENCE TO RELATED APPLICATIONS

The present disclosure is a continuation-application of International (PCT) Patent Application No. PCT/CN2020/110309, filed on Aug. 20, 2020, which claims a priority to Chinese Patent Application No. 201910775848.4, filed on Aug. 21, 2019, the content of which is herein incorporated by reference in its entirety.

TECHNICAL FIELD

The present disclosure generally relates to the technical field of video-coding, and in particular to a linear model prediction method, a coder, and a non-transitory storage medium.

BACKGROUND

As a video image has a large amount of data, it is usually necessary to be encoded and compressed, and then be transmitted or stored. The encoded data is called a video stream. Limited by hardware and other conditions, such as limited storage space and limited transmission bandwidth, the encoder always hopes to keep the video stream as small as possible.

Video coding mainly includes video-acquisition, prediction, transform quantization and entropy coding. The prediction can be divided into intra prediction, inter prediction and linear prediction.

Linear prediction refers that a linear model between a reference block and a current coding block is constructed, and then pixel values of the current block are predicted from reconstructed pixels of the reference block through the linear model. Parameters of the linear model are calculated by using pixel values of adjacent reconstructed pixels of the current coding block and adjacent reconstructed pixels of the reference block of the current coding block.

Common linear prediction modes include the cross-component linear model (CCLM) mode and the local illumination compensation (LIC) mode. In the CCLM mode, a linear model between the luma component and the chroma component of the same block is constructed to use the luma component to predict the chroma component of the same block, and this reduces redundancy between cross-color spaces. In the LIC mode, adjacent reconstructed pixels of the current block and adjacent reconstructed pixels of the reference block are used to construct a linear model to compensate difference in brightness between the reference frame and the current frame.

According to relative position relationships between the adjacent reconstructed pixels for calculating parameters of the linear model and the current coding block, the CCLM mode is further divided into three types: LM, LM_L, and LM_T. Adjacent reconstructed pixels for calculating the model in LM are located on the left and top side of the current coding block. Adjacent reconstructed pixels for calculating the model in LM_L are located on the left side of the current coding block. Adjacent reconstructed pixels for calculating the model in LM_T are located at the top side of the current coding block.

Currently, the linear prediction has certain limitations. The farther a pixel in the current coding block is from the adjacent reconstructed pixels, the lower prediction accuracy this pixel has. This affects overall linear prediction accuracy, and especially for a coding block with a large size.

SUMMARY

According to one aspect of the present disclosure, a linear model (LM) prediction method is provided is disclosed. The method includes dividing a current coding block into at least two sub-blocks; for each of the sub-blocks, constructing a linear model, wherein parameters of the linear model are calculated by using pixel values of adjacent reconstructed pixels of the sub-block and adjacent reconstructed pixels of a reference sub-block of the sub-block; and predicting the sub-block by using the linear model, and obtaining a LM prediction value of the sub-block.

According to another aspect of the present disclosure, a coder is provided, which includes a processor. The processor is configured to execute instructions to perform dividing a current coding block into at least two sub-blocks; for each of the sub-blocks, constructing a linear model, wherein parameters of the linear model are calculated by using pixel values of adjacent reconstructed pixels of the sub-block and adjacent reconstructed pixels of a reference sub-block of the sub-block; and predicting the sub-block by using the linear model, and obtaining a LM prediction value of the sub-block.

According to yet another aspect of the present disclosure, a non-transitory storage medium is provided, which stores instructions, when executed, causing a processor to perform dividing a current coding block into at least two sub-blocks; for each of the sub-blocks, constructing a linear model, wherein parameters of the linear model are calculated by using pixel values of adjacent reconstructed pixels of the sub-block and adjacent reconstructed pixels of a reference sub-block of the sub-block; and predicting the sub-block by using the linear model, and obtaining a LM prediction value of the sub-block.

According to yet another aspect of the present disclosure, a device for linear model prediction is provided, which includes a dividing module, configured for dividing a current coding block into at least two sub-blocks; for each of the sub-blocks, a constructing module, configured for constructing a linear model, wherein parameters of the linear model are calculated by using pixel values of adjacent reconstructed pixels of the sub-block and adjacent reconstructed pixels of a reference sub-block of the sub-block; and a predicting module, configured for predicting the sub-block using the linear model and obtaining a LM prediction value of the sub-block.

DETAILED DESCRIPTION

Figure 1:
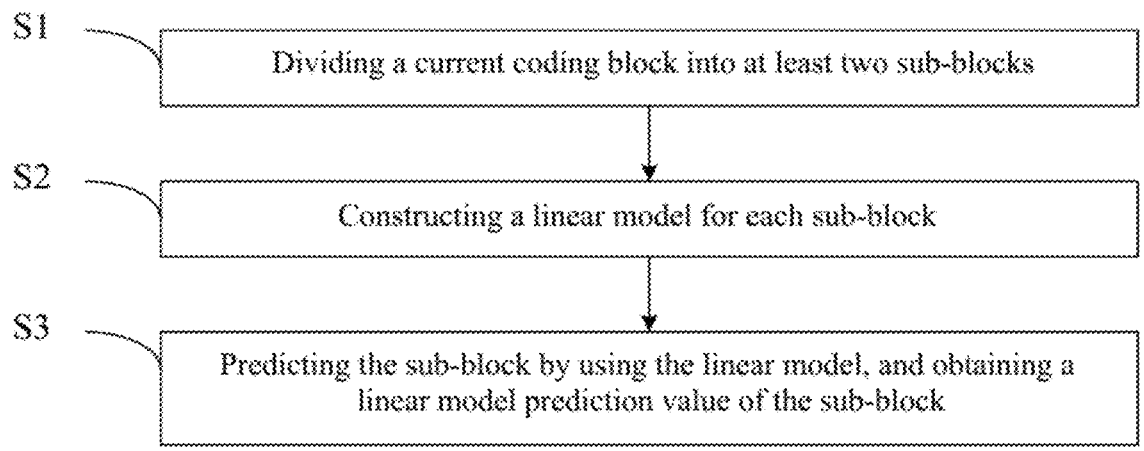
FIG. 1 is a schematic flowchart of a linear model prediction method according to some embodiments of the present disclosure.

The technical solutions in embodiments of the present disclosure will be clearly and completely described below in conjunction with the drawings in embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

The terms "first", "second" and "third" in the present disclosure are only used for descriptive purposes, and cannot be understood as indicating or implying relative importance or implicitly indicating the number of indicated technical features. Therefore, the features defined with "first", "second", and "third" may explicitly or implicitly include at least one of the features. In the description of the present disclosure, "a plurality of" means at least two, such as two, three, etc., unless otherwise specifically defined. All directional indications (such as up, down, left, right, front, back) in embodiments of the present disclosure are only used to explain the relative positional relationships and movements between components in a specific posture as shown in the drawing, and the directional indication will also change accordingly as the specific posture changes. In addition, the terms "including", "having", and any variations thereof are intended to cover non-exclusive inclusion. For example, a process, method, system, product, or device that includes a series of actions or units is not limited to the listed actions or units, but optionally includes unlisted actions or units, or optionally also includes other actions or units inherent to the process, method, product, or device.

Reference to "embodiments" herein means that a specific feature, structure, or characteristic described in conjunction with the embodiments may be included in at least one embodiment of the present disclosure. The phrase in various places in the specification neither necessarily refer to the same embodiment, nor an independent or alternative embodiment mutually exclusive with other embodiments. Those skilled in the art clearly and implicitly understand that the embodiments described herein can be combined with other embodiments if there is no conflict.

FIG. 1 is a schematic flowchart illustrating a linear model prediction method according to some embodiments of the present disclosure. It should be noted that, if there are substantially same results, this embodiment is not limited to an order of a process shown in FIG. 1. As shown in FIG. 1, the method includes actions/operations in the following.

At S1, the method divides a current coding block into at least two sub-blocks.

The current coding block refers to a block currently to be coded, which can be referred to as the current block for short. In some cases, the current coding block may be called a coding unit (CU).

Different sub-blocks do not overlap with each other, and different sub-blocks are not necessarily the same in size. All the sub-blocks may be rectangular, or at least part of the sub-blocks is irregular in shape.

A division-manner of the current coding block may be selected according to parameters of the current coding block. For example, the current coding block may be divided according to at least one of a linear model type and size information of the current coding block. Of course, other division-manner can also be used, which are not limited here. The current coding block and its reference block are divided in the same manner. With the current coding block being divided according to parameters of the current coding block, the current coding block can be divided into at least two one sub-blocks effectively, then it is facilitated to construct a linear model and perform linear prediction for each sub-block, and thus, compared with linear prediction being performed for the current coding block directly, this improves prediction accuracy using linear model for the current coding block.

The division according to the linear model type may specifically be that the current coding block is divided horizontally and/or vertically if the linear model type of the current coding block is LM or LIC. If the linear model type of the current coding block is LM_L, the current coding block is divided vertically. If the linear model type of the current coding block is LM_T, the current coding block is divided horizontally.

Vertical division means that the dividing-line is in the vertical direction, and horizontal division means that the dividing-line is in the horizontal direction. In the LM/LIC mode, the adjacent reconstructed pixels for calculating parameters of the linear model are located on the top side and the left side of a sub-block and its reference block. In the LM-L mode, the adjacent reconstructed pixels for calculating parameters of the linear model are located on the left side of the sub-block and its reference block. In the LM-T mode, the adjacent reconstructed pixels for calculating parameters of the linear model are located on the top side of the sub-block and its reference block. Due to the above-mentioned division according to the linear model type, it can ensure that at least part of adjacent reconstructed pixels of at least one sub-block belong to another sub-block of the same current coding block.

A specific example of division according to the linear model type will be explained in conjunction with the drawings.

Figure 2:
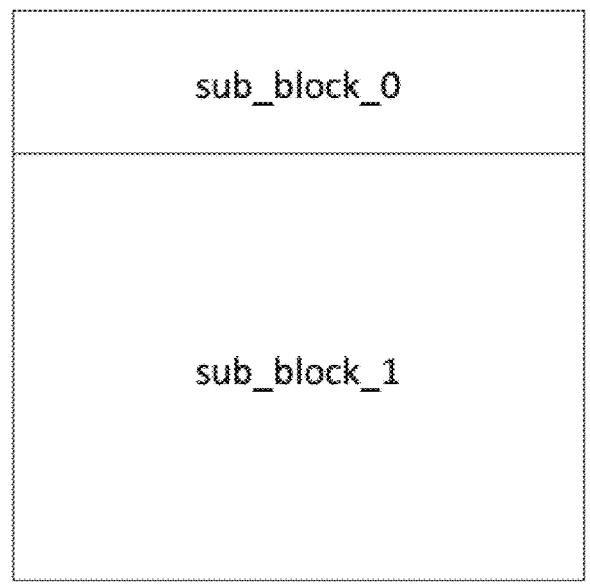
FIG. 2 is a schematic diagram illustrating the current block is divided into sub-blocks using the LM_T mode.

As shown in FIG. 2, the current block with a size of 16×16 adopts the LM_T mode, and the current block can be horizontally divided into two sub-blocks sub_block_0 and sub_block_1, sizes of which are 16×4 and 16×12, respectively.

Figure 3:
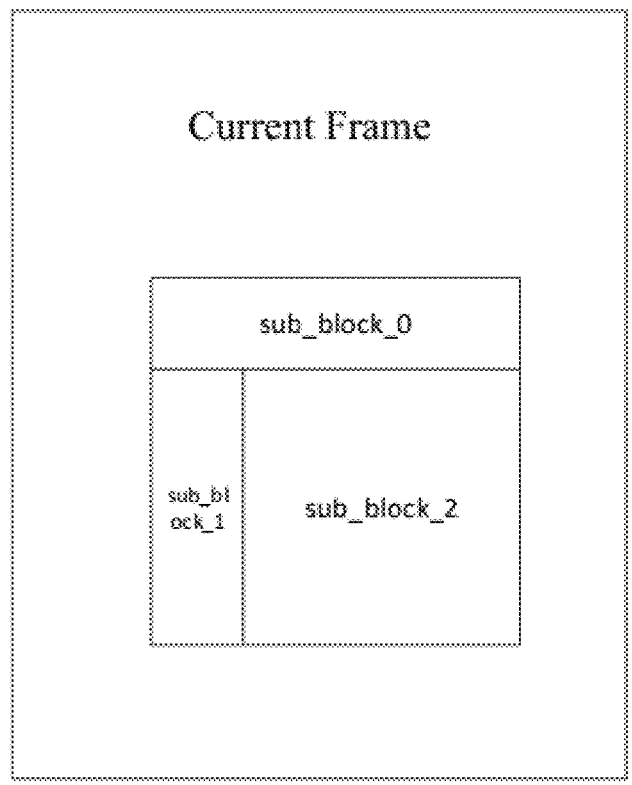
FIG. 3 is a schematic diagram illustrating the current block is divided into sub-blocks using the LIC mode.

As shown in FIG. 3, the current block with a size of 16×16 adopts the LIC mode, and the current block can be horizontally and vertically divided into three sub-blocks: sub_block_0, sub_block_1, and sub_block_2, sizes of which are 16×4, 4×12 and 12×12, respectively.

Division according to size information may specifically be that, the current coding block is divided vertically if a width of the current coding block is greater than a height of the current coding block, the current coding block is divided horizontally if the width of the current coding block is less than the height of the current coding block, and the current coding block is divided horizontally and/or vertically if the width of the current coding block is equal to the height of the current coding block. There is no limit to the number of sub-blocks and sizes of sub-blocks obtained through the dividing. At the same time, the linear model type of the current coding block is not limited.

What is determined based on the size information may be the first division-manner, and then one or some sub-blocks may be further divided vertically and/or horizontally.

A specific example of sub-block division according to the size information will be explained in conjunction with the drawings.

Figure 4:
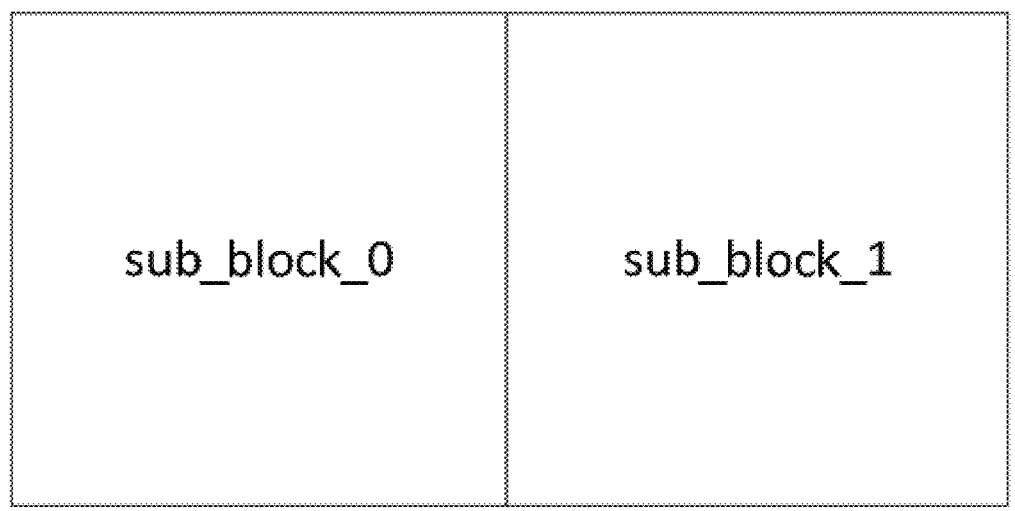
FIG. 4 is a schematic diagram illustrating the current block with a size of 16×8 is divided into sub-blocks.

As shown in FIG. 4, the size of the current block is 16×8, and the current block can be vertically divided into two sub-blocks sub_block_0 and sub_block_1, sizes of which are 8×8 and 8×8, respectively.

Of course, the current coding block can also be irregularly divided, and at least part of the obtained sub-blocks has an irregular shape, for example, L-shape, or stepped shape.

Specific examples of irregular-division are described in conjunction with the drawings.

Figure 5:
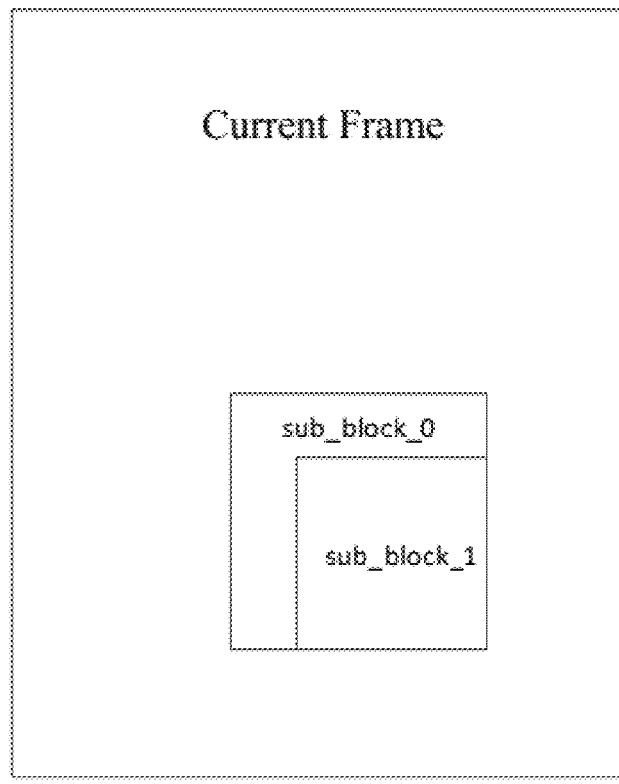
FIG. 5 is a schematic diagram illustrating an L-shaped division of the current block with a size of 16×16.

As shown in FIG. 5, the size of the current block is 16×16, and the current block can be divided into two sub-blocks sub_block_0 and sub_block_1. The division-manner is L-shaped division, a size of the sub-block sub_block_1 is 12×12, and the L-shaped sub-block sub_block_0 can be regarded as a combination of a block with a size of 16×4 and a block with a size of 4×16.

Figure 6:
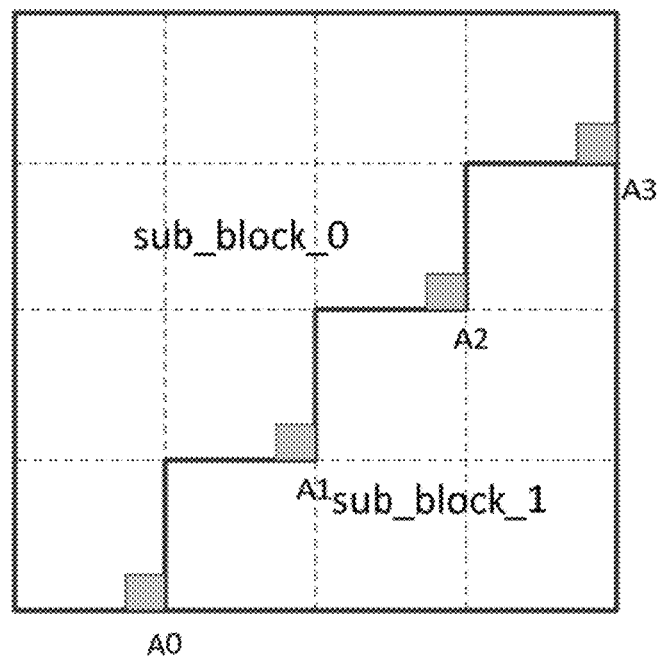
FIG. 6 is a schematic diagram illustrating a stepped division of the current block with a size of 16×16.

As shown in FIG. 6, the size of the current block is 16×16, and the current block can be divided into two sub-blocks sub_block_0 and sub_block_1. The division-manner is diagonal-stepped division, the sub-block sub_block_0 can be regarded as a combination of 10 blocks with a size of 4×4, and the sub-block sub_block_1 can be regarded as a combination of 6 blocks with a size of 4×4.

At S2, the method constructs a linear model for each sub-block.

Parameters of the linear model are calculated by using pixel values of adjacent reconstructed pixels of the sub-block and its reference sub-block. A reference sub-block of a sub-block refers to a part corresponding to the sub-block after the reference block of the current coding block is divided in the same manner as the current coding block is divided. Of course, it can also be understood that, a reference sub-block of a sub-block is obtained as the way of obtaining the reference block from the current coding block is applied to the sub-block. Adjacent reconstructed pixels are located on the coded side of the sub-block or reference sub-block, which is specifically determined by an order of the encoding/decoding. For example, in a case where the order of encoding/decoding is from left to right and from top to bottom, the coded side is the left side and/or the top side.

The linear model type of each sub-block may be the same as the linear model type of the current coding block. In this case, since the adjacent reconstructed pixels used for calculating linear model parameters may be different, different sub-blocks may have different linear model parameters, such that different sub-blocks have different linear models. Of course, at least one sub-block can select a linear model different from the linear model type of the current coding block. For example, the current coding block adopts the LM mode, and a sub-block may adopt LM, LM_L, or LM_T.

For each sub-block, adjacent reconstructed pixels are obtained and then parameters of the linear model are calculated in a way consistent with a way in which parameters of the linear model of the current coding block. Examples are illustrated in the following to describe specific calculation-manners of linear model parameters of two current coding blocks.

Specifically, in the CCLM mode, the luma component of the same block is used to predict the chroma component, which means that the Y component is used to predict the Cb or Cr component, so as to reduce the redundancy between cross-color spaces. The current coding block is a chroma block. Since the size of a luma block corresponding to a same image-area is generally twice that of the chroma block, the luma block and its adjacent reconstructed pixels must be down-sampled first.

In CCLM mode, the constructed linear model between luminance and chroma components is in equation (1)

$$pred_C(i, j) = \alpha \cdot rec'_L(i, j) + \beta \quad (1)$$

$rec_L'$ is a reference block obtained by down-sampling the luma block, and $pred_c(i, j)$ is the linear model prediction value (referred to as the prediction value) of the current coding block. $\alpha$ and $\beta$ are the parameters of the linear model, which can be calculated from the adjacent reconstructed pixels of the current coding block and a corresponding reference block.

If all adjacent reconstructed pixels cannot be obtained, then $\alpha=0$, $\beta=(1<<BitDepth)>>1$, where BitDepth=10, << represents a left shift operation, and >> represents a right shift operation.

If it is possible to obtain adjacent reconstructed pixels, 4 adjacent reconstructed pixels of the reference block are selected. $x_A^0$ and $x_A^1$ with minimum pixel values are selected from these 4 pixels, and correspondingly, reference pixels of the current encoding block are $y_A^0$ and $y_A^1$ (which have same locations with the current block/reference block). $x_B^0$ and $x_B^1$ with maximum pixel values are selected, and correspondingly, reference pixels of the current encoding block are $y_B^0$ and $y_B^1$. The equation (2) is as follows.

$$x_A = (x_A^0 + x_A^1 + 1) \gg 1; x_B = (x_B^0 + x_B^1 + 1) \gg 1; \quad (2)$$
$$y_A = (y_A^0 + y_A^1 + 1) \gg 1; y_B = (y_B^0 + y_B^1 + 1) \gg 1$$

$\alpha$ and $\beta$ are calculated in equations (3) as follows.

$$\alpha = \frac{y_B - y_A}{x_B - x_A} \quad (3)$$
$$\beta = y_A - \alpha x_A$$

The 4 adjacent reconstructed pixels are selected in following rules.

[a]. In the LM mode, if there exist adjacent reconstructed pixels on both the left and top sides, four adjacent reconstructed pixels [W/4, −1], [3 W/4, −1], [−1, H/4], [−1, 3H/4] are selected, W represents widths of the current coding block and reference block, H represents heights of the current coding block and reference block. If there only exist adjacent reconstructed pixels on the left or top side, the existed adjacent reconstructed pixels are used to fill sides at which there exist no adjacent reconstructed pixels to form four pixels.

[b]. In LM_L mode, four adjacent reconstructed pixels [−1, (W+H)/8], [−1, 3(W+H)/8], [−1, 5(W+H)/8], and [−1, 7(W+H)/8] are selected.

[c]. In LM_T mode, four adjacent reconstructed pixels [(W+H)/8, −1], [3 (W+H)/8, −1], [5 (W+H)/8, −1], [7 (W+H)/8, −1] are selected.

The coordinates of these adjacent reconstructed pixels are relative coordinates with respect to the top-left pixel of the current block or reference block, i.e. coordinates in a case where the top-left pixel of the current block/reference block are set to [0,0]. After determining the four adjacent reconstructed pixels, α and β can be calculated according to the equation (2) and equation (3).

Specifically, in the LIC mode, a linear model is constructed by using adjacent reconstructed pixels of the current block and adjacent reconstructed pixels of the reference block to compensate for the difference in brightness between the reference frame and the current frame.

In a case of uni-prediction, the linear model is as follows.

$$P(x, y) = \alpha \cdot P_r(x + v_x, y + v_y) + \beta \quad (4)$$

P(x, y) is the prediction value of the current coding block, and $P_r(x+v_x, y+v_y)$ is the reference block in the reference frame to which is pointed by the motion vector $[v_x, v_y]$.

α and β are calculated in equation (5) as follows.

$$\alpha = \left( \frac{\Sigma ref(s) \times cur(r) - \frac{\Sigma ref(s) \times \Sigma cur(r)}{N}}{\Sigma cur(r)^2 - \frac{\Sigma ref(s) \times \Sigma ref(s)}{N}} \right) \quad (5)$$

$$\beta = \frac{\Sigma cur(r)}{N} - \alpha \times \frac{\Sigma ref(s)}{N}$$

ref(s) is an adjacent reconstructed pixel of the reference block, cur(r) is an adjacent reconstructed pixel of the current block, and N is the number of adjacent reconstructed pixels.

In a case of bi-prediction, α and β are calculated as the uni-prediction in each direction, and the bi-prediction linear model is constructed as follows:

$$P(x, y) = (1 - w) \times (\alpha_0 \cdot P_r^0(x + v_x^0, y + v_y^0) + \beta_0) + \quad (6)$$
$$w \times (\alpha \cdot P_r^1(x + v_x^1, y + v_y^1) + \beta_1)$$

$P_r^0(x+v_x^0, y+v_y^0)$ and $P_r^1(x+v_x^1, y+v_y^1)$ are a reference block in the L0 and L1 directions, respectively, $\alpha_0$, $\beta_0$ and $\alpha_1$, $\beta_1$ are linear model parameters calculated according to equation (5) with the adjacent reconstructed pixels of the current block and the adjacent reconstructed pixels of the reference block in the L0 and L1 directions, respectively. (1−w) and w are weights for prediction values in the L0 and L1 directions.

In the process of calculating linear model parameters for a sub-block, pixel values of adjacent reconstructed pixels of the sub-block and its reference sub-block are used. If an edge of a sub-block/reference sub-block adjacent to the adjacent reconstructed pixels is a straight line, for example, when the sub-block is rectangular or L-shaped, the calculation manner of linear model parameters of the current coding block can be directly adopted. If the edge of the sub-block/reference sub-block adjacent to the adjacent reconstructed pixels is not a straight line, but a stepped line, and a linear model type of the sub-block is CCLM, the calculation manner of the linear model parameters of the current coding block is directly adopted, in which at least one of the selected 4 adjacent reconstructed pixels is not actually adjacent to the sub-block/reference sub-block. At this time, the selection manner of adjacent reconstructed pixels can be adjusted to ensure that the selected adjacent reconstructed pixels are actually adjacent to the sub-block/reference sub-block.

For example, in FIG. 6, four adjacent reconstructed pixels A0, A1, A2, and A3 selected for sub_block_1 are located at corners of the stepped edge of sub_block_1.

At S3, the method predicts the sub-block by using the linear model, and obtains a linear model prediction value of the sub-block.

The reference sub-block of the sub-block can be substituted into the linear model to calculate the linear model prediction value of the sub-block.

In this embodiment, for each sub-block, a linear model is independently constructed and linear prediction is performed, so that a more suitable linear model can be used for prediction of each sub-block, which improves the accuracy of prediction using linear model.

Figure 7:
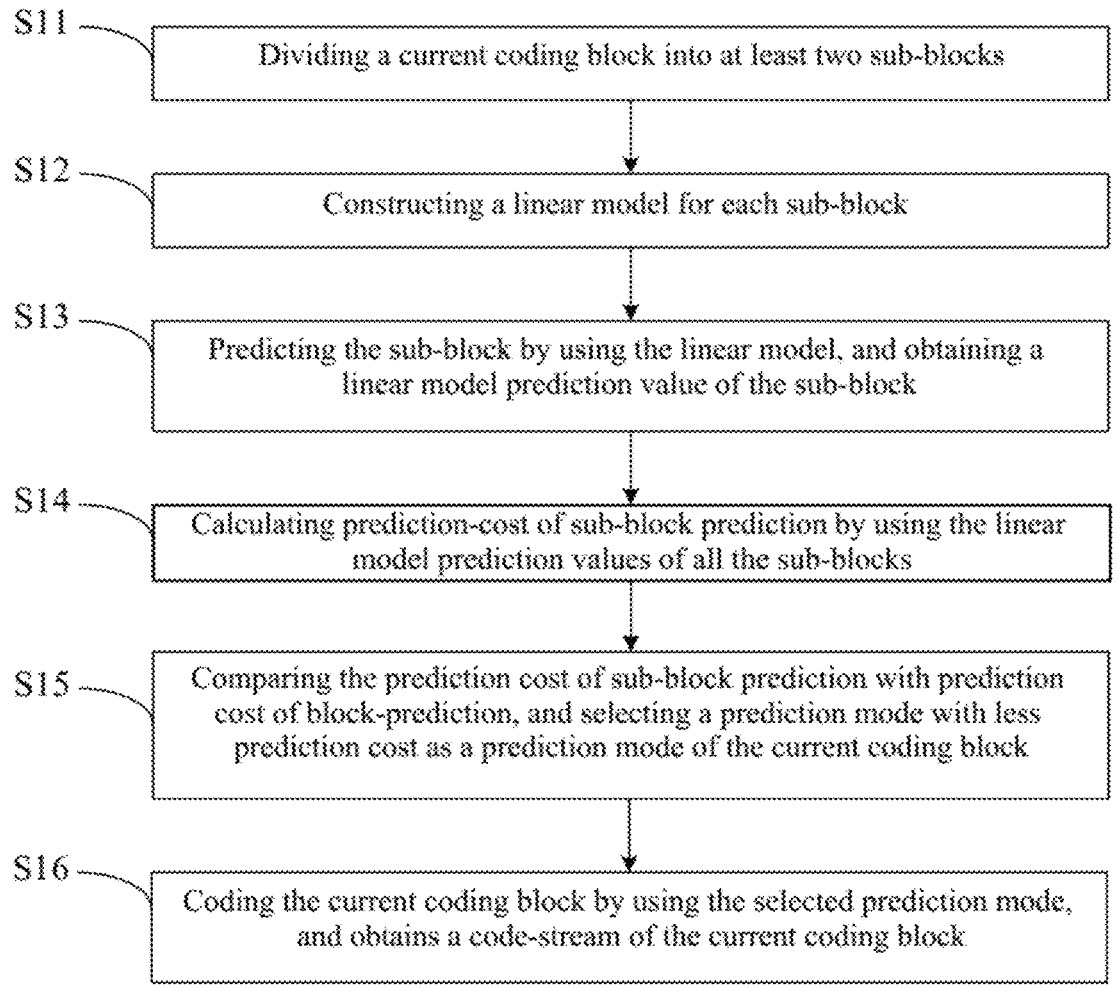
FIG. 7 is a schematic flowchart of a linear model prediction method according to some embodiments of the present disclosure.

FIG. 7 is a schematic flowchart of a linear model prediction method according to some embodiments of present disclosure. This embodiment is a further extension based on the linear model prediction method according to above embodiments of the present disclosure. It should be noted that, if there are substantially same results, this embodiment is not limited to the order of a process shown in FIG. 7. As shown in FIG. 7, the method includes actions/operations in the following.

At S11, the method divides a current coding block into at least two sub-blocks.

At S12, the method constructs a linear model for each sub-block.

At S13, the method predicts the sub-block by using the linear model, and obtains a linear model prediction value of the sub-block.

At S14, the method calculates prediction-cost of sub-block prediction by using the linear model prediction values of all the sub-blocks.

The prediction cost of sub-block prediction can be calculated using sub-block linear model prediction values of the current block. The linear model prediction values of all sub-blocks are contained into the sub-block linear model prediction value of the current block.

At S15, the method compares the prediction cost of sub-block prediction with prediction cost of block-prediction, and selects a prediction mode with less prediction cost as a prediction mode of the current coding block.

The prediction cost of block-prediction is prediction cost for which linear model prediction is performed on the current coding block directly.

At S16, the method codes the current coding block by using the selected prediction mode, and obtains a code-stream of the current coding block.

In this embodiment, as the prediction-cost of sub-block prediction is calculated compared with the prediction cost of block-prediction, a prediction mode with less prediction cost is selected as a prediction mode of the current coding block, and thus, the current coding block can be coded with less coding cost. That is, this can reduce coding cost when the current coding block is coded.

In some embodiments, the code-stream of the current coding block includes a sub-block prediction flag, and the sub-block prediction flag is used to indicate whether the current coding block adopts sub-block prediction. With the sub-block prediction flag, whether the current coding block adopts sub-block prediction is achieved simply and effectively, and thus, it is easy to distinguish what prediction is used as the current coding block is coded. The sub-block prediction flag can be implemented in many manners. Three examples are given below.

In an example, the sub-block prediction flag includes a sub-block prediction syntax element, and a value of the sub-block prediction syntax element are used to indicate whether the current coding block adopts sub-block prediction and a manner in which the current coding block is divided.

For example, a new syntax element CCLM_SUB_PRED can be added to indicate whether the current block needs to perform sub-block prediction and the manner in which the current coding block is divided when the current block adopts the CCLM mode.

When CCLM_SUB_PRED is 0, it means that the current block is predicted according to the existing technology when CCLM is used, and no division is required, and when CCLM_SUB_PRED is 1, it means that the current block needs to be horizontally divided when CCLM is used for prediction. When both the width and height of the current block $>=16$, the current block is divided into 4 sub-blocks with a same size, otherwise, the current block is divided into 2 sub-blocks with same size. When CCLM_SUB_PRED is 2, it indicates that the current block needs to be divided vertically when CCLM is used for prediction. When both the width and height of the current block $>=16$, the current block is divided into 4 sub-blocks with the same size, otherwise, the current block is divided into 2 sub-blocks with the same size. When CCLM_SUB_PRED is 3, it indicates that the current block needs to be divided in L-shaped division when CCLM is used for prediction. When both the width and height of the current block $>=16$, the current block be divided in L-shaped division twice, otherwise, the current block is divided in L-shaped division once. The width and height of each divided rectangular block is ¾ of the width and height of the original block. Other values of CCLM_SUB_PRED can be added to correspond to other division-manners.

In another example, the sub-block prediction flag includes a sub-block prediction syntax element. The value of the sub-block prediction syntax element is used to indicate whether the current coding block adopts sub-block prediction, and when the current coding block adopts sub-block prediction, the sub-block prediction flag further includes a manner in which the current coding block is divided.

For example, a syntax element CCLM_SUB_PRED can be added to indicate whether the current block needs to perform sub-block prediction when the CCLM mode is adopted.

When CCLM_SUB_PRED is 0, it means that the current block is predicted according to the existing technology when CCLM is used, and no division is required, and when CCLM_SUB_PRED is 1, it means that the current block needs to be divided into sub-blocks when CCLM is used for prediction, and another syntax element is added to indicate the manner in which the current coding block is divided.

In yet another example, the sub-block prediction flag includes a sequence number of intra-prediction mode of the current coding block, where when the current coding block adopts sub-block prediction, the sequence number of intra-frame prediction mode of the current coding block is a newly added sequence number.

For example, K newly added intra-prediction modes are used to indicate CCLM which uses sub-block prediction, and $1<=K<=3$. This scheme can only be applied to CCLM. Assume that sequence numbers of the existing intra prediction modes (including DC, Planar, Angle, etc.) are 0~N, then the sequence number for indicating the CCLM which uses sub-block prediction is greater than N.

Figure 8:
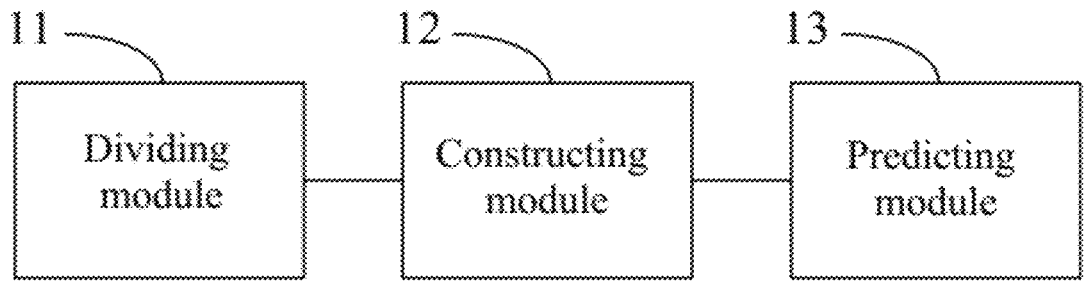
FIG. 8 is a schematic diagram of a device for linear model prediction according to some embodiments of the present disclosure.

FIG. 8 is a schematic diagram of a device for linear model prediction according to some embodiments of the present disclosure. As shown in FIG. 8, the device includes a dividing module 11, a constructing module 12, and a predicting module 13.

The dividing module 11 is configured for dividing a current coding block into at least two sub-blocks.

For each of the sub-blocks, the constructing module 12 is configured for constructing a linear model, wherein parameters of the linear model are calculated by using pixel values of adjacent reconstructed pixels of the sub-block and adjacent reconstructed pixels of a reference sub-block of the sub-block.

the predicting module 13 is configured for predicting the sub-block using the linear model and obtaining a linear model prediction value of the sub-block.

Figure 9:
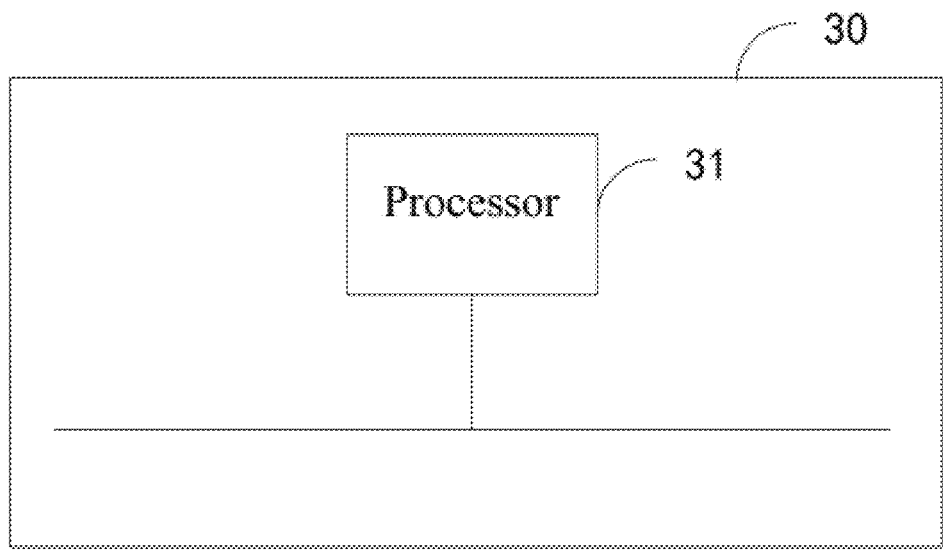
FIG. 9 is a schematic diagram a coder according to some embodiments of the present disclosure.

FIG. 9 is a schematic diagram a coder according to some embodiments of the present disclosure. As shown in FIG. 9, the coder 9 includes a processor 31.

The processor 31 may also be referred to as a CPU (Central Processing Unit). The processor 31 may be an integrated circuit chip with signal processing capabilities. The processor 31 may also be a general-purpose processor, a digital signal processor (DSP), an application specific integrated circuit (ASIC), a field programmable gate array (FPGA) or other programmable logic device, a discrete gate or transistor logic component, or a discrete hardware component. The general-purpose processor may be a microprocessor, or the processor may also be any conventional processor.

The coder may further include a memory (not shown in the drawings) for storing instructions and data required for operations of the processor 31.

The processor 31 is configured to execute instructions to implement the method according to any embodiment and any non-conflicting combination of the linear model prediction method of the present disclosure.

Figure 10:
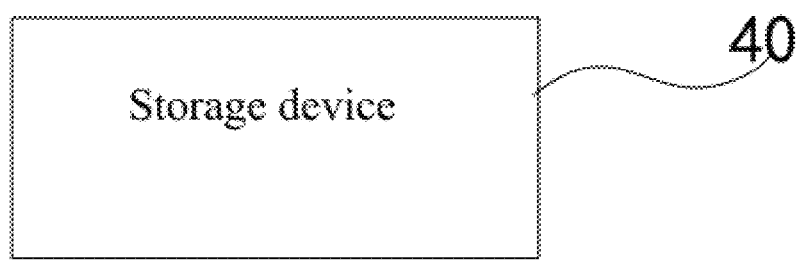
FIG. 10 is a schematic diagram a storage device according to some embodiments of the present disclosure.

FIG. 10 is a schematic diagram a storage device according to some embodiments of the present disclosure. The storage device 40 of the present disclosure stores instructions, which when executed, the method according to any embodiment or any non-conflicting combination of the linear model prediction method of the present disclosure is performed. The instruction may form a program file and be stored in the above-mentioned storage device in the form of a software product, so that a computer device (e.g. a personal computer, a server, or a network device, etc.) or a processor executes all or a part of actions/operations in the method according to various implementations of the present disclosure. The aforementioned storage device includes a U disk, a mobile hard disk, a read-only memory (ROM), a random access memory (RAM), magnetic disks or optical disks, and other media that can store program codes.

In several embodiments provided in the present disclosure, it should be understood that, the disclosed system, device, and method may be implemented in other ways. For example, the device described above are merely illustrative, for example, the division of units is only a logical function division, and there may be other divisions in actual implementation, for example, multiple units or components can be combined or integrated into another system, or some features can be ignored or not implemented. In addition, the displayed or discussed mutual coupling or direct coupling or communication connection may be indirect coupling or communication connection through some interfaces, devices, or units, and may be in electrical, mechanical, or other forms.

In addition, the functional units in the various embodiments of the present disclosure may be integrated into one processing unit, or each unit may exist alone physically, or two or more units may be integrated into one unit. The above-mentioned integrated unit can be implemented in the form of hardware or software functional unit. The above are only implementations of the present disclosure, and do not limit the scope of the present disclosure. Any equivalent structure or equivalent process transformation made by using the description and drawings of the present disclosure, or directly or indirectly applied to other related technical fields, are included in the scope of the present disclosure similarly.

What is claimed is:

1. A linear model (LM) prediction method, comprising:
   dividing a current coding block into at least two sub-blocks;
   for each of the sub-blocks,
      constructing a linear model, wherein parameters of the linear model are calculated by using pixel values of adjacent reconstructed pixels of the sub-block and adjacent reconstructed pixels of a reference sub-block of the sub-block; and
      predicting the sub-block by using the linear model, and obtaining a LM prediction value of the sub-block;
      wherein, the adjacent reconstructed pixels are located at a coded side of the sub-block and is located in another sub-block of the at least two sub-blocks, the another sub-block and the sub-block belong to one coding block; and
      when no adjacent reconstructed pixel is present on a side of the sub-block and the adjacent reconstructed pixels are present on another side of the sub-block, the present adjacent reconstructed pixels are used to fill the side at which no adjacent reconstructed pixel is present.

2. The method of claim 1, wherein the dividing a current coding block comprises:
   dividing the current coding block according to a linear model type of the current coding block.

3. The method of claim 2, wherein the dividing the current coding block according to a linear model type of the current coding block comprises:
   if the linear model type of the current coding block is LM or local illumination compensation (LIC), dividing the current coding block horizontally or vertically;
   if the linear model type of the current coding block is LM or LIC, dividing the current coding block horizontally and vertically;
   if the linear model type of the current coding block is LM_L, dividing the current coding block vertically; or
   if the linear model type of the current coding block is LM_T, dividing the current coding block horizontally.

4. The method of claim 1, wherein the dividing a current coding block comprises:
   dividing the current coding block according to size information of the current coding block.

5. The method of claim 4, wherein the dividing the current coding block according to a size of the current coding block comprises:
   if a width of the current coding block is greater than a height of the current coding block, dividing the current coding block vertically;
   if the width is less than the height, dividing the current coding block horizontally;
   if the width is equal to the height, dividing the current coding block horizontally and vertically; or
   if the width is equal to the height, dividing the current coding block horizontally or vertically.

6. The method of claim 1, wherein at least one of the sub-blocks has a shape of non-rectangle.

7. The method of claim 1, wherein if a linear model type of the sub-block is cross-component linear model (CCLM) and a coded side of the sub-block has a stepped edge, the adjacent reconstructed pixels of the sub-block used for calculating the parameters of the linear model of the sub-block belong to another sub-block adjacent to the sub-block.

8. The method of claim 1, wherein the LM prediction value of the sub-block is calculated by substituting the reference sub-block of the sub-block into the linear model.

9. The method of claim 1, further comprising:
   calculating prediction cost of sub-block prediction by using LM prediction values of all the sub-blocks;
   comparing the prediction cost of sub-block prediction with prediction cost of block-prediction and selecting a prediction mode with less prediction cost as a prediction mode of the current coding block, wherein the prediction cost of block-prediction indicates prediction cost for which linear model prediction is performed on the current coding block; and
   coding the current coding block by using the selected prediction mode, and obtaining a code-stream of the current coding block, wherein the code stream of the current coding block comprises a sub-block prediction flag, and the sub-block prediction flag is configured for indicating whether the current coding block adopts sub-block prediction.

10. The method of claim 9, wherein the sub-block prediction flag comprises a sub-block prediction syntax element, and a value of the sub-block prediction syntax element is configured for indicating whether the current coding block adopts sub-block prediction and a manner in which the current coding block is divided; or
    the sub-block prediction flag comprises a sub-block prediction syntax element, and a value of the sub-block prediction syntax element is configured for indicating whether the current coding block adopts sub-block prediction, and the sub-block prediction flag further comprises a manner in which the current coding block is divided when the current coding block adopts sub-block prediction; or
    the sub-block prediction flag comprises a sequence number of intra-prediction mode of the current coding block, wherein the sequence number is newly added when the current coding block adopts sub-block prediction.

11. A device for linear model (LM) prediction, comprising:
    a dividing module, configured for dividing a current coding block into at least two sub-blocks;
    for each of the sub-blocks,
       a constructing module, configured for constructing a linear model, wherein parameters of the linear model are calculated by using pixel values of adjacent reconstructed pixels of the sub-block and adjacent reconstructed pixels of a reference sub-block of the sub-block; and
    a predicting module, configured for predicting the sub-block using the linear model and obtaining a LM prediction value of the sub-block;

wherein, the adjacent reconstructed pixels are located at a coded side of the sub-block and is located in another sub-block of the at least two sub-blocks, the another sub-block and the sub-block belong to one coding block; and when no adjacent reconstructed pixel is present on a side of the sub-block and the adjacent reconstructed pixels are present on another side of the sub-block, the present adjacent reconstructed pixels are used to fill the side at which no adjacent reconstructed pixel is present.

12. A coder, comprising a processor, wherein the processor is configured to execute instructions to perform:

dividing a current coding block into at least two sub-blocks;

for each of the sub-blocks, constructing a linear model, wherein parameters of the linear model are calculated by using pixel values of adjacent reconstructed pixels of the sub-block and adjacent reconstructed pixels of a reference sub-block of the sub-block; and predicting the sub-block by using the linear model, and obtaining a linear model (LM) prediction value of the sub-block;

wherein, the adjacent reconstructed pixels are located at a coded side of the sub-block and is located in another sub-block of the at least two sub-blocks, the another sub-block and the sub-block belong to one coding block; and when no adjacent reconstructed pixel is present on a side of the sub-block and the adjacent reconstructed pixels are present on another side of the sub-block, the present adjacent reconstructed pixels are used to fill the side at which no adjacent reconstructed pixel is present.

13. The coder of claim 12, wherein the current coding block is divided according to a linear model type of the current coding block.

14. The coder of claim 13, wherein if the linear model type of the current coding block is LM or local illumination compensation (LIC), the current coding block is divided horizontally or vertically;

if the linear model type of the current coding block is LM or LIC, the current coding block is divided horizontally and vertically;

if the linear model type of the current coding block is LM_L, the current coding block is divided vertically; or if the linear model type of the current coding block is LM_T, the current coding block is divided horizontally.

15. The coder of claim 12, wherein the current coding block is divided according to size information of the current coding block.

16. The coder of claim 15, wherein if a width of the current coding block is greater than a height of the current coding block, the current coding block is divided vertically;

if the width is less than the height, the current coding block is divided horizontally;

if the width is equal to the height, the current coding block is divided horizontally or vertically; or if the width is equal to the height, the current coding block is divided horizontally and vertically.

17. The coder of claim 12, wherein if a linear model type of the sub-block is cross-component linear model (CCLM) and a coded side of the sub-block has a stepped edge, the adjacent reconstructed pixels of the sub-block used for calculating the parameters of the linear model of the sub-block belong to another sub-block adjacent to the sub-block.

18. The coder of claim 12, wherein the LM prediction value of the sub-block is calculated by substituting the reference sub-block of the sub-block into the linear model.

19. The coder of claim 12, wherein the processor is configured to execute instructions to further perform:

calculating prediction cost of sub-block prediction by using LM prediction values of all the sub-blocks;

comparing the prediction cost of sub-block prediction with prediction cost of block-prediction and selecting a prediction mode with less prediction cost as a prediction mode of the current coding block, wherein the prediction cost of block-prediction indicates prediction cost for which linear model prediction is performed on the current coding block; and coding the current coding block by using the selected prediction mode, and obtaining a code-stream of the current coding block, wherein the code stream of the current coding block comprises a sub-block prediction flag, and the sub-block prediction flag is configured for indicating whether the current coding block adopts sub-block prediction.

20. The coder of claim 19, wherein the sub-block prediction flag comprises a sub-block prediction syntax element, and a value of the sub-block prediction syntax element is configured for indicating whether the current coding block adopts sub-block prediction and a manner in which the current coding block is divided; or the sub-block prediction flag comprises a sub-block prediction syntax element, and a value of the sub-block prediction syntax element is configured for indicating whether the current coding block adopts sub-block prediction, and the sub-block prediction flag further comprises a manner in which the current coding block is divided when the current coding block adopts sub-block prediction; or the sub-block prediction flag comprises a sequence number of intra-prediction mode of the current coding block, wherein the sequence number is newly added when the current coding block adopts sub-block prediction.

* * * * *